Jan. 11, 1944.   M. D. MARTIN ET AL   2,339,089
CENTRALIZING DEVICE
Filed May 12, 1942
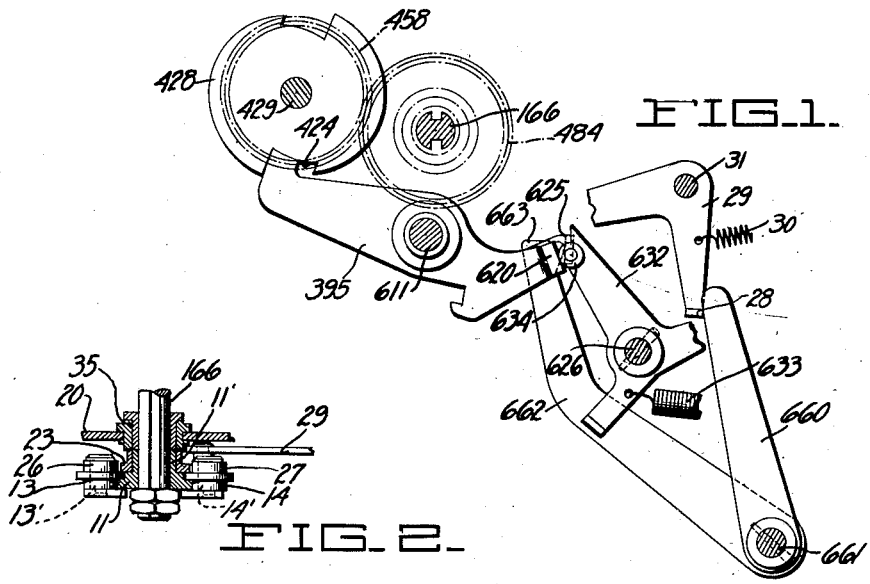
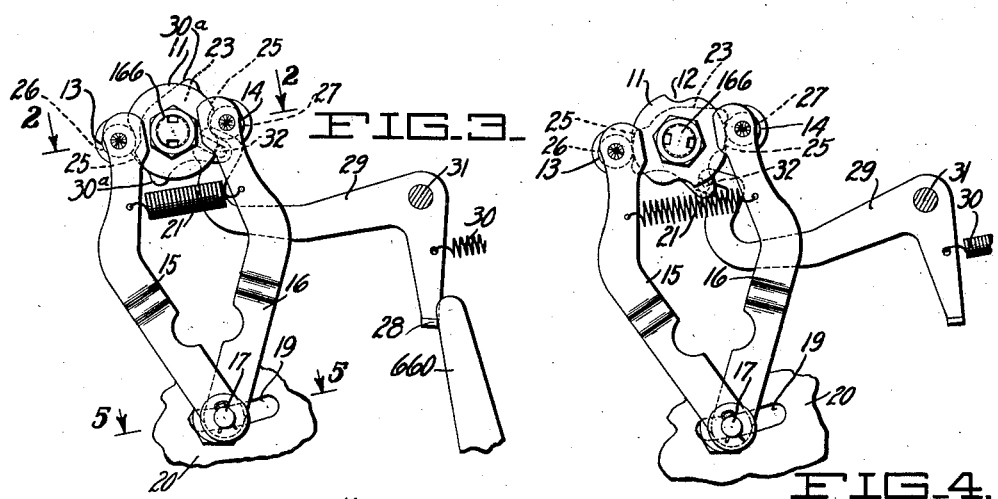
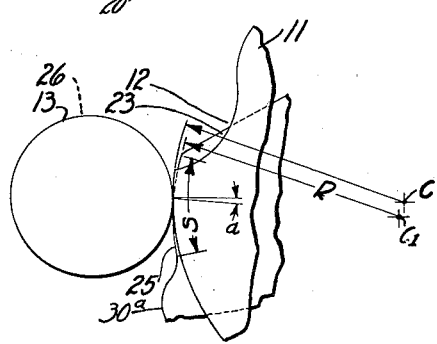
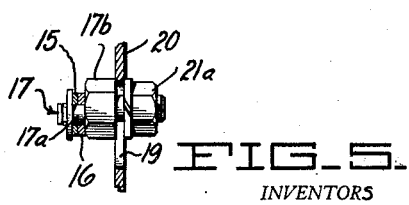
INVENTORS
MARVIN D. MARTIN
KENNETH A. SNELL.
BY
ATTORNEYS Patented Jan. 11, 1944

2,339,089

UNITED STATES PATENT OFFICE 2,339,089

CENTRALIZING DEVICE

Marvin D. Martin, Berkeley, and Kenneth A. Snell, Alameda, Calif., assignors to Marchant Calculating Machine Company, a corporation of California Application May 12, 1942, Serial No. 442,604

12 Claims. (Cl. 192—12)

This invention relates to rotary, cyclically operable calculating machines and the like, and has particular reference to improvements in devices for accurately locating rotatable elements thereof in definite cyclic positions as such elements come to rest after a single or a multicyclic operation of the machine. Such devices are commonly known as "centralizing devices."

The invention is preferably embodied in a centralizing device employed in connection with the actuator unit of a calculating machine, being an improvement on a device of the same general character which has been used on the well known Marchant calculating machines and which is disclosed in Figure 51 of the patent to Harold T. Avery Number 2,216,659, issued October 1, 1940. Reference may be had to said patent for a disclosure of a complete calculating machine including mechanism not specifically described herein.

However, it is to be understood that the invention is not limited to use in connection with machines of this type or even to use in connection with a calculating machine, and that such variations may be made as are within the scope of the invention as set forth in the appended claims.

One object of the present invention is to reduce to a minimum the force necessary to operate a centralizing device of the present type.

Another object is to reduce the noise and wear incident to the operation of a centralizing device.

Another object is to permit a large tolerance in manufacturing limits for centralizing devices of the present type.

A still further object is to provide a simple, inexpensive, and quiet centralizing device capable of centralizing a cyclically operable mechanism either after a single cycle or after a multicyclic operation.

The centralizing device disclosed in the above mentioned Avery patent, although satisfactory in operation, produces a certain degree of noise during a multicyclic operation such as multiplication and division due to the fact that when dimensional errors within ordinary manufacturing tolerances are present, the centralizing rollers can not be held locked in the position they occupy during contact with the concentric portion of the centralizing cam. A certain amount of clearance must be permitted to allow the locking means to move into position to lock the centralizers against movement into the notches of the cam. Therefore, each time the actuator passes full cycle position the centralizing rollers drop slightly into the depressions or notches of the cam and are cammed out again, causing a noticeable noise and vibration.

Other centralizing devices have been devised in the past in which the centralizing rollers have actually been held out beyond the periphery of the concentric portion of the cam. However, these devices are relatively more complicated and considerable force must be used to unlatch the same, thereby requiring motor driven or at least relatively strong spring unlatching means.

The manner in which the above mentioned and other objects of the invention are accomplished will be readily understood on reference to the following specification when read in conjunction with the accompanying drawing, wherein:

Figure 1 is an elevational view from the left hand side of a Marchant calculating machine of the character disclosed in the aforesaid patent, illustrating the main clutch, the controls therefor, and the means associated with such controls for controlling the centralizing device for the actuator.

Figure 2 is a sectional plan view of the centralizing device and is taken along the line 2—2 of Figure 3.

Figure 3 is a left side view of the device showing the same in centralizing position.

Figure 4 is a view similar to that of Figure 3 showing the actuator out of full cycle position and the centralizing device out of centralizing position.

Figure 5 is a sectional plan view of the adjustable pivot support for the centralizer arms and is taken along the line 5—5 of Figure 3.

Figure 6 is an enlarged schematic view illustrating details of construction of the centralizing cam and roller wedging or disabling lever.

As described in detail in the above mentioned Avery patent the machine to which the mechanism of the present invention is applied has incorporated therein a cyclically operable main clutch 428 driven by the machine motor (not shown). This clutch, when engaged, transmits rotation through gears 458 and 484 to an actuator shaft 166 forming part of the actuator unit. The ratio of the gearing between the main clutch and the shaft 166 is such that for each cycle of operation (one-half revolution) of the main clutch 428 the actuator shaft 166 is also operated through one cycle (one-half revolution).

The main clutch 428 is controlled by a clutch dog 395 which is normally spring urged, as shown in the above mentioned patent, into contact with notches 424 formed on the periphery of the clutch to hold the clutch disengaged. However, upon initiation of operation of the machine to perform a calculating function, the dog 395 is rocked counter-clockwise out of contact with one of the clutch notches 424, enabling the clutch to engage and thereby drive the actuator shaft 166.

Means are provided to hold the clutch dog 395 out of contact with the main clutch to cause a multi-cyclic operation thereof during multiplication and division. This comprises a latch 632 pinned on a rockable shaft 626 and urged counter-clockwise by a tension spring 633 extending between the latch and the machine framework. The latch 632 has a roller 634 thereon which is adapted to be positioned under an ear 620 formed on the dog 395.

When a multiplication or division operation involving multi-cyclic operation of the main clutch is instituted, the spring 633 is allowed to hold the latch 632 against the ear 620 of the clutch dog and when the dog is thereafter rocked to engage the main clutch, the roller 634 is moved to a position underlying the ear 620, thereby allowing the main clutch to continue for the desired number of cycles, during the last cycle of which the latch is automatically rocked clockwise to release the clutch dog. The clutch dog 395 may be released during any part of the last cycle of a multi-cyclic operation and will merely ride on the periphery of the clutch 428 until it seats in one of the notches 424. Release of the main clutch dog 395 by the latch 632 causes the centralizing device to become effective to centralize the actuator shaft 166 as will presently appear.

The centralizing device comprises a centralizer cam 11 keyed on the actuator shaft 166 and having a circular periphery provided with two diametrically opposed depressions 12 formed thereon. The cam 11 is engaged by flanged centralizing rollers 13 and 14 rotatably mounted on studs 13' and 14' (Figure 2), on the upper ends of arms 15 and 16, respectively. Both arms are pivoted on an adjustable frame-carried pin 17.

The rollers 13 and 14 are so arranged as to engage the opposite notches 12 in the cam 11 when the shaft 166 is in centralized position, and to permit adjustment of the rollers to insure such engagement, the pivot pin 17 (Figures 3, 4, and 5) has the bearing portions 17a thereof arranged eccentric to the main portion 17b, the latter comprising a threaded stud extending through a slot 19 in the left machine frame plate 20 and secured in adjusted position therein by a clamp nut 21a. Also, the curved slot 19 is concentric with the actuating shaft 166 so that the rollers 13 and 14 may be adjusted in position about the cam 11 to compensate for any errors due to angular misalignment of the cam 11 on actuator shaft 166.

A tension spring 21 is extended between the arms 15 and 16, and when the machine is at rest (as illustrated in Figures 1 and 3), the spring is effective to hold the rollers 13 and 14 in the depressions 12 of cam 11 and thus hold the shaft 166 accurately located in full cycle position. The provision of the two arms 15 and 16 and rollers 13 and 14 provides a better centralizing action than a single arm and roller would provide and also results in a much lower load on the bearing 35 (Figure 2) for shaft 166 than would be the case if only a single arm and roller were used.

Means are provided for preventing the spring 21 from forcing the rollers 13 and 14 into the notches 12 when the shaft 166 passes full cycle position during continuous multicyclic operation and thereby eliminates the noise and wear which would otherwise result therefrom. As shown in Figures 2, 3, and 4 a roller wedging or disabling lever 23 is disposed adjacent the cam 11 and has a bearing portion pivotally mounted on the hub 11' of the cam 11. The lever 23 has diametrically opposed raised portions 25 which are adapted, upon clockwise rocking movement of the lever 23 from its position illustrated in Figure 3 and after the rollers 13 and 14 have been cammed outward by the cam 11, to contact rollers 26 and 27 mounted on the studs 13' and 14' concentrically with the rollers 13 and 14, respectively, and thereby hold the rollers 13 and 14 in their outer positions illustrated in Figure 4, overcoming the action of spring 21. It should be noted that the diameters of rollers 26 and 27 are identical with the diameters of rollers 13 and 14.

The position of the lever 23 is controlled by the main clutch dog 395 (Figure 1) in the following manner. Suitably secured to the dog is an ear 625 engaged by the camming nose 663 of an arm 662 which is rigidly connected by a rockable shaft 661 to a second arm 660, the latter being engaged by an ear 28 of a bell crank 29 pivoted on the frame pin 31 and urged counter-clockwise against the arm 660 by a tension spring 30 extending between the bell crank 29 and the machine frame.

The bell crank 29 is bifurcated at its left hand end to embrace a pin 32 extending from the roller disabling lever 23 so that when the main clutch dog 395 is spring moved to clutch disengaging position (illustrated in Figure 1), the dog will rock the arms 662 and 660 counter-clockwise, transmitting movement through the bell crank 29 to rock the wedging lever 23 counter-clockwise to the position illustrated in Figure 3 wherein the raised portions 25 will be moved away from under the rollers 26 and 27. Therefore, the spring 21 may become effective to move the rollers into the notches 12 of cam 11 or to press the rollers against the periphery of the cam 11 in the event that the shaft 166 has not yet reached full cycle position.

When the main clutch dog 395 is rocked counter-clockwise to cause engagement of the main clutch, the ear 620 thereon will be moved upwardly, passing considerably above the upper surface of the camming nose 663, so that the arm 662 will be released to allow the spring 30 to become effective to rock the bell crank 29 and the roller wedging lever 23 to their disabling position which is approximately that illustrated in Figure 4, but which may vary slightly as will appear hereinafter. At this time the main clutch will operate causing rotation of the shaft 166 and the cam 11, and the latter will cam the rollers 13 and 14 outwardly until they ride on the concentric portion thereof. The spring 30 is therefore allowed to rock the lever 29 and roller wedging lever 23 to a position wherein the raised portions 25 of lever 23 contact the rollers 26 and 27. Since the radial dimension measured between the opposite contacting points of the raised portions 25, is the same as the diameter of the concentric portions of the cam 11, as will be explained in detail presently, the actuator shaft 166 may pass its full cycle position without entry of the rollers 13 and 14 into the centralizing notches 12 of the cam 11. During the last cycle of operation of the main clutch, the clutch dog 395 is permitted to be rocked against the periphery of the main clutch 428 under a spring pressure which is stronger than that of spring 30 and, as before stated, forces the arms 662 and 660 to rock the bell crank 29 and lever 23 into their positions illustrated in Figure 3. Now, as the actuator shaft 166 reaches full cycle position the spring 21 will be allowed to force the rollers 13 and 14 into the notches 12 to centralize the actuator unit.

Referring to the enlarged schematic view in Figure 6, it will be seen that the center $C_1$ of the radius R of the raised portion 25 on lever 23 is not coincident with the center C of the cam 11 and shaft 166, but is somewhat offset therefrom, with the result that the raised portions 25 form wedging or camming surfaces.

Theoretically, the center $C_1$ should be so placed that the periphery of the raised portion 25 intersects the periphery of the cam 11 at a point midway between the limits of the arcuate raised portion 25 as defined by the dimension S. However, due to allowances for manufacturing tolerances, this intersection may, in actual practice, be situated above or below such midway point without in any way affecting the operation of the device. That is, if the point of intersection were above the midway point the spring 30 would merely rock the bell crank 29 and lever 23 somewhat further to contact the rollers 26 and 27 than would be the case if the point of intersection were below such midway point. In either case, however, the raised portions 25 would prevent even a slight drop of the rollers 13 and 14 into the notches 12 of the cam 11 during a multi-cyclic operation of the actuator. It should, therefore, be noted that the center $C_1$ should be so displaced relative to the center C that, within the range of possible variations in dimensions of the cam 11 and lever 23 due to the usual tolerance in manufacturing limits, the raised portions 25 will contact the rollers 26 and 27 somewhere along the length S thereof.

Lobes 30a are formed on the lever 23 adjacent the higher ends of the raised portions 25 to limit against the rollers 26 and 27 in the possible event that the raised portions 25 contact the rollers at their highest points.

The relationship between the strength of spring 21 and spring 30 is preferably such that the spring 30 is ineffective to cause the roller wedging lever 23 to cam the arms 15 and 16 outward of its own accord. Also, in practice, it has been found preferable to arrange the center $C_1$ so that radial lines passing through the centers C and $C_1$, and intersecting at the theoretical intersection of the surfaces of the concentric portion of cam 11 and the raised portion 25, form an angle of approximately 3°. This angle has been found sufficient to enable the relatively heavy spring 21 to hold the rollers 13 and 14 against the concentric portions of the periphery of the cam 11, against the urge of spring 30, but is insufficient to allow the spring 21 to cause the rollers 26 and 27 to cam the wedging lever 23 counterclockwise of its disabling position shown in Figure 4 during passage of the notches 12 in cam 11 past the rollers 13 and 14 at the normal operating speed of the machine and, therefore, the rollers 13 and 14 cannot enter the depressions 12 at this time. Furthermore, the above camming angle is such as to allow the spring 21 to tend to aid the spring urged clutch dog 395 in forcing the arms 662, 660, bell crank 29 and wedging lever 23 toward their disabling positions of Figures 1 and 3 at the end of a single or multicyclic operation.

As a modification of the preferred embodiment of the invention and operation thereof, the spring 30 may be replaced by a stronger spring which would be strong enough to always cause the lever 23 to cam the rollers 13 and 14 entirely out of contact with the concentric portions of the cam 11 during operation of the main clutch. In this event, the lobes 30a would always limit against the rollers 26 and 27.

We claim:

1. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member movable into wedging engagement with said centralizing member to maintain the same at any position to which it is moved by said cam upon rotation thereof, and means responsive to said control means upon termination of operation of said mechanism thereby for moving said wedging member out of engagement with said centralizing member.

2. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member pivotally supported for rocking movement through a limited angle about the axis of rotation of said cam and rockable into wedging engagement with said centralizing member to maintain the same at any position to which it is moved by said cam upon rotation thereof, and means responsive to said control means upon termination of operation of said mechanism thereby for rocking said wedging member out of engagement with said centralizing member.

3. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member movable into wedging engagement with said centralizing member to maintain the same out of engagement with the low portion of said cam, means comprising a spring for moving said wedging member into engagement with said centralizing member, said last named means being incapable of causing said wedging member to move said centralizing member out of engagement with the high portion of said cam, and means responsive to said control means upon termination of operation of said mechanism thereby for moving said wedging member out of engagement with said centralizing member.

4. In a cyclically operable mechanism of the character described including a rotatable cam having a high portion and a low portion, the combination with control means for initiating operation of said mechanism and for terminating operation thereof; of a centralizing member spring urged into engagement with said cam, a wedging member pivotally supported for movement about the axis of rotation of said cam and rockable into wedging engagement with said centralizing member to maintain the same out of engagement with the low portion of said cam, means comprising a spring for rocking said wedging member into engagement with said centralizing member, said last named means being incapable of causing said wedging member to move said centralizing member out of engagement with the high portion of said cam, and means responsive to said control means upon termination of operation of said mechanism thereby for rocking said wedging member out of engagement with said centralizing member.

5. In a cyclically operable mechanism of the character described including a rotatable cam having opposed low portions, the combination with control means for initiating operation of said mechanism and for terminating operation thereof; of spring urged centralizing members for concomitantly engaging said low portions, a wedging member pivotally supported for movement about the axis of rotation of said cam and rockable into wedging engagement with said centralizing members to maintain the same out of engagement with the low portions of said cam, means comprising a spring for rocking said wedging member into engagement with said centralizing members, said spring means being incapable of causing said wedging member to move said centralizing members out of engagement with said cam, and means responsive to said control means upon termination of operation of said mechanism thereby for rocking said wedging member out of engagement with said centralizing member.

6. In a cyclically operable mechanism of the character described including a cyclic clutch; a control member therefor movable to clutch engaging and disengaging positions, and a rotatable cam driven by said clutch and having a high portion and a low portion; the combination of a centralizing member spring urged into engagement with said cam, a wedging member movable into wedging engagement with said centralizing member to maintain the same at any position to which said member is moved by said cam upon rotation thereof, and means responsive to said control member upon movement thereof to clutch disengaging position for moving said wedging member out of engagement with said centralizing member.

7. In a cyclically operable mechanism of the character described including a cyclic clutch, a control member therefor movable to clutch engaging and disengaging positions; and a rotatable cam driven by said clutch and having a high portion and a low portion; the combination of a centralizing member spring urged into contact with said cam, a wedging member movable into wedging engagement with said centralizing member to maintain the same out of engagement with the low portion of said cam, means including a spring for moving said wedging member into engagement with said centralizing member, said means being incapable of causing said wedging member to move said centralizing member out of engagement with said cam, and means responsive to said control member upon movement thereof to clutch engaging position for causing operation of said first named means, said last named means being responsive to said control member upon movement thereof to clutch disengaging position for moving said wedging member out of engagement with said centralizing member.

8. In a cyclically operable mechanism of the character described including a cyclic clutch, a control member therefor movable to clutch engaging and disengaging positions, and a rotatable cam driven by said clutch and having a high portion and a low portion; the combination of a centralizing member spring urged into contact with said cam, a wedging member pivotally supported for movement about the axis of rotation of said cam and rockable into wedging engagement with said centralizing member to maintain the same out of engagement with the low portion of said cam, means including a spring for rocking said wedging member into engagement with said centralizing member, said spring means being incapable of causing said wedging member to move said centralizing member out of engagement with said cam, and means responsive to said control member upon movement thereof to clutch engaging position for causing operation of said first named means, said last named means being responsive to said control member upon movement thereof to clutch disengaging position for rocking said wedging member out of engagement with said centralizing member.

9. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member movable into wedging engagement with said centralizing member to maintain the same at any position to which said member is moved by said cam upon rotation thereof, and means responsive to said control means upon initiation of the operation of said mechanism thereby for moving said wedging member into engagement with said centralizing member; said last named means being responsive to said control means upon termination of the operation of said mechanism thereby for moving said wedging member out of engagement with said centralizing member.

10. In a cyclically operable mechanism of the character described including a rotatable cam having a high portion and a low portion; the combination with control means for initiating operation of said mechanism and for terminating operation thereof; of a centralizing member spring urged into engagement with said cam, a non-rotatable wedging member pivotally supported for rocking movement about the axis of rotation of said cam and rockable into wedging engagement with said centralizing member to maintain the same at any position to which said member is moved by said cam upon rotation thereof, and means responsive to said control means upon initiation of the operation of said mechanism thereby for rocking said wedging member into engagement with said centralizing member; said last named means being responsive to said control means upon termination of the operation of said mechanism thereby for rocking said wedging member out of engagement with said centralizing member.

11. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member movable into engagement with said centralizing member so as to engage the centralizing member at a camming angle less than the angle of friction effective between said two members, and means responsive to said control means upon termination of operation of said mechanism thereby for moving said wedging member out of engagement with said centralizing member.

12. In a cyclically operable mechanism of the character described including a rotatable cam having a high portion and a low portion; the combination with control means for initiating operation of said mechanism and for terminating operation thereof; of a centralizing member spring urged into engagement with said cam, a wedging member movable into engagement with said centralizing member so as to engage the centralizing member at a camming angle less than the angle of friction effective between said two members, and means responsive to said control means upon initiation of operation of said mechanism thereby for moving said wedging member into engagement with said centralizing member, said last named means being incapable of causing said wedging member to move said centralizing member out of engagement with the high portion of said cam.

MARVIN D. MARTIN.
KENNETH A. SNELL.